(12) United States Patent
Jancic et al.

(10) Patent No.: US 7,784,192 B2
(45) Date of Patent: Aug. 31, 2010

(54) SWIR VISION AND ILLUMINATION DEVICES

(75) Inventors: Dale A. Jancic, Bedford, NH (US); Richard P. Grauslys, Litchfield, NH (US); Roger T. Hohenberger, Windham, NH (US)

(73) Assignee: L-3 Insight Technology Incorporated, Londonderry, NH (US)

( * ) Notice: Subject to any disclaimer, the term of this patent is extended or adjusted under 35 U.S.C. 154(b) by 161 days.

(21) Appl. No.: 12/015,736

(22) Filed: Jan. 17, 2008

(65) Prior Publication Data

US 2009/0224154 A1 Sep. 10, 2009

Related U.S. Application Data

(60) Provisional application No. 60/885,454, filed on Jan. 18, 2007, provisional application No. 60/909,786, filed on Apr. 3, 2007, provisional application No. 60/939,377, filed on May 22, 2007.

(51) Int. Cl.
*G01B 11/27* (2006.01)
*G01C 15/02* (2006.01)

(52) U.S. Cl. ........................................... 33/286
(58) Field of Classification Search .................... 33/286
See application file for complete search history.

(56) References Cited

U.S. PATENT DOCUMENTS

| | | | | |
|---|---|---|---|---|
| 3,867,764 | A * | 2/1975 | Dunmire et al. | 42/115 |
| 5,272,514 | A * | 12/1993 | Dor | 356/251 |
| 5,502,455 | A * | 3/1996 | Ferrin et al. | 345/9 |
| 5,539,990 | A * | 7/1996 | Le | 33/283 |
| 6,460,447 | B1 * | 10/2002 | Meyers et al. | 89/41.06 |
| 6,819,495 | B2 * | 11/2004 | Shani et al. | 359/630 |
| 6,892,488 | B1 * | 5/2005 | Serravalle | 42/113 |
| 6,941,665 | B1 * | 9/2005 | Budrow et al. | 33/286 |
| 6,964,106 | B2 * | 11/2005 | Sergyeyenko et al. | 33/286 |
| 7,204,027 | B2 * | 4/2007 | Tacklind | 33/286 |
| 7,493,722 | B2 * | 2/2009 | Howe et al. | 42/146 |
| 2004/0060222 | A1 * | 4/2004 | Oz | 42/146 |
| 2004/0093749 | A1 * | 5/2004 | Wu | 33/286 |
| 2007/0056174 | A1 * | 3/2007 | Bascom et al. | 33/286 |
| 2007/0271800 | A1 * | 11/2007 | Hersey et al. | 33/286 |
| 2008/0060248 | A1 * | 3/2008 | Pine et al. | 42/114 |
| 2008/0276473 | A1 * | 11/2008 | Raschella et al. | 33/286 |

\* cited by examiner

*Primary Examiner*—Christopher W Fulton

(57) ABSTRACT

An aiming device is configured to generate an infrared cross on a target. The cross having a principal wavelength above the wavelength detectable by image intensification night vision devices. A night vision system having a short wave infrared detector includes an illuminator having a principal wavelength above the wavelength detectable by image intensification night vision devices. A beacon is configured to generate light at a wavelength above which can be scene with image intensification night vision devices.

7 Claims, 11 Drawing Sheets

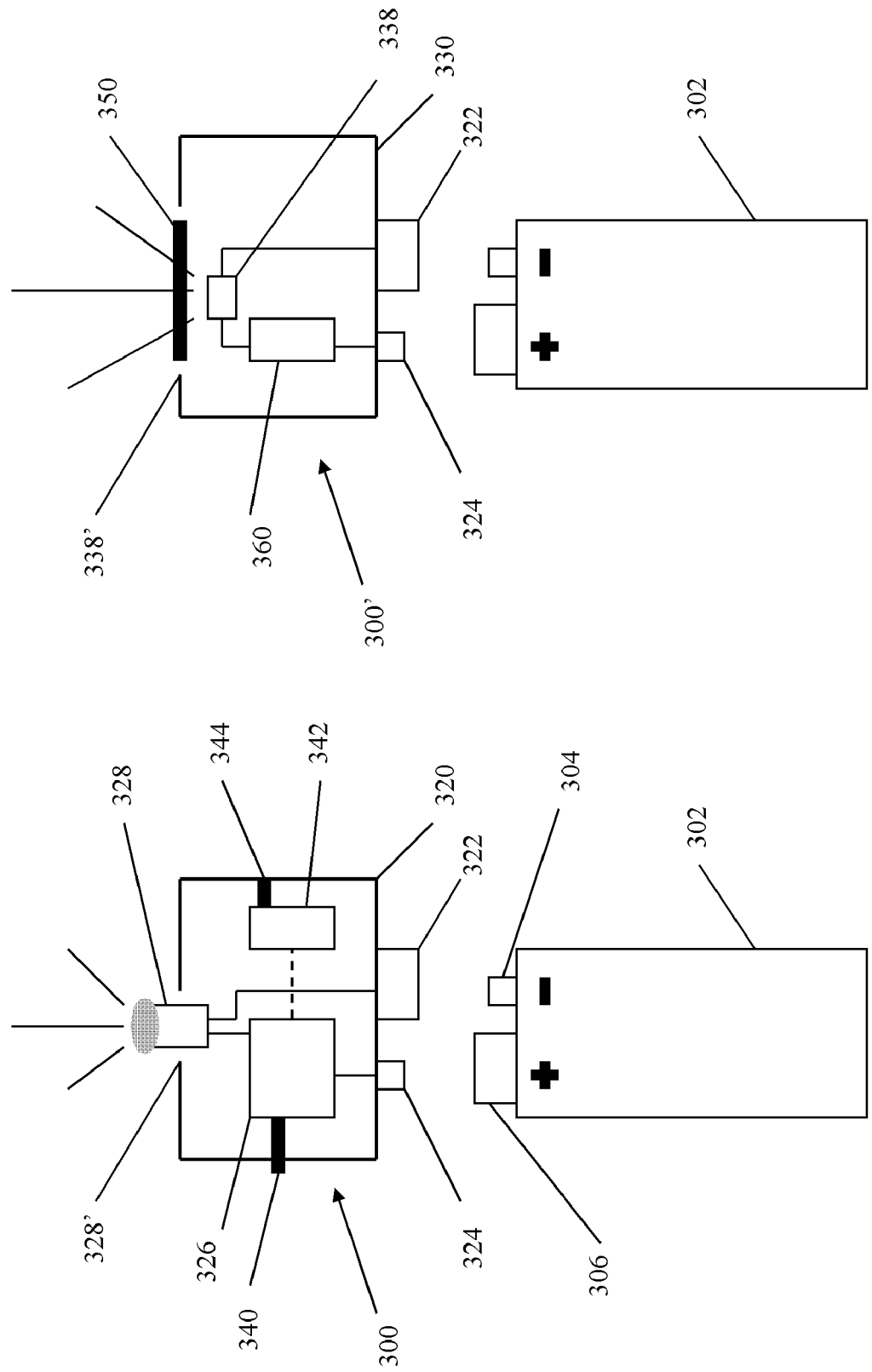

SWIR VISION AND ILLUMINATION DEVICES

CROSS REFERENCE TO RELATED APPLICATIONS

The present application claims the benefit of U.S. provisional patent applications Ser. No. 60/885,454, filed Jan. 18, 2007, Ser. No. 60/909,786, filed Apr. 3, 2007, and Ser. No. 60/939,377, filed May 22, 2007, the entire disclosures of which are incorporated herein by reference.

BACKGROUND OF THE INVENTION

Night vision systems have been used by the military and law enforcement agencies and include image intensification, thermal imaging, and fusion devices. These devices may be monoculars, binoculars, or goggles and may be hand-held, weapon mounted, or helmet mounted. Night vision systems are typically equipped with one or more image intensifier tubes to allow an operator to see visible wavelength and a small portion of infrared wavelength radiation (approximately 400 nm to approximately 900 nm). They work by collecting the tiny amounts of light that are present but may be imperceptible to our eyes and amplifying it to the point that an operator can easily observe the image.

These systems may be used with weapon mounted aiming and illumination devices to rapidly acquire, identify, and accurately fire on enemy targets for use in daytime and nighttime missions. An optical bench assembly located within a weapon-mounted housing may be used to hold the electrical and optical components. The housing may provide protection from unintended contact or debris. The device may be coupled to the weapon with a suitable attachment mechanism, for example a rail grabber, SLIDE-LOCK® mechanism, or other clamp and generate one or more visible and/or infrared collimated point light beams.

Mechanical adjustors extending through the housing and in contact with the optical bench assembly may be used to steer the optical axis of the light beams relative to the housing. This may enable a user to boresight the light beams to some reference, such as a point of impact of a projectile at a known distance or a barrel mounted boresight laser.

Shortwave infrared illuminators operating around 830 nm have been used in conjunction with night vision systems to flood the scene or area of interest to improve viewability and an infrared aiming/pointing laser also operating around 830 nm have been used to point out an area or person of interest. Since these illuminators and pointers are operating above the visible spectrum (450-750 nm) they cannot be seen with the naked eye. A drawback to these illuminators and pointers is that they can be detected by the enemy if the enemy is equipped with image intensification night vision devices, which operate from approximately 400 nm to approximately 900 nm.

BRIEF DESCRIPTION OF THE DRAWINGS

For a better understanding of the present invention, together with other objects, features and advantages, reference should be made to the following detailed description which should be read in conjunction with the following figures wherein like numerals represent like parts:

FIG. 11A is a block diagram of a SWIR beacon consistent with a first embodiment of the invention.

FIG. 11B is a block diagram of a SWIR beacon consistent with a second embodiment of the invention.

DETAILED DESCRIPTION

Figure 1:
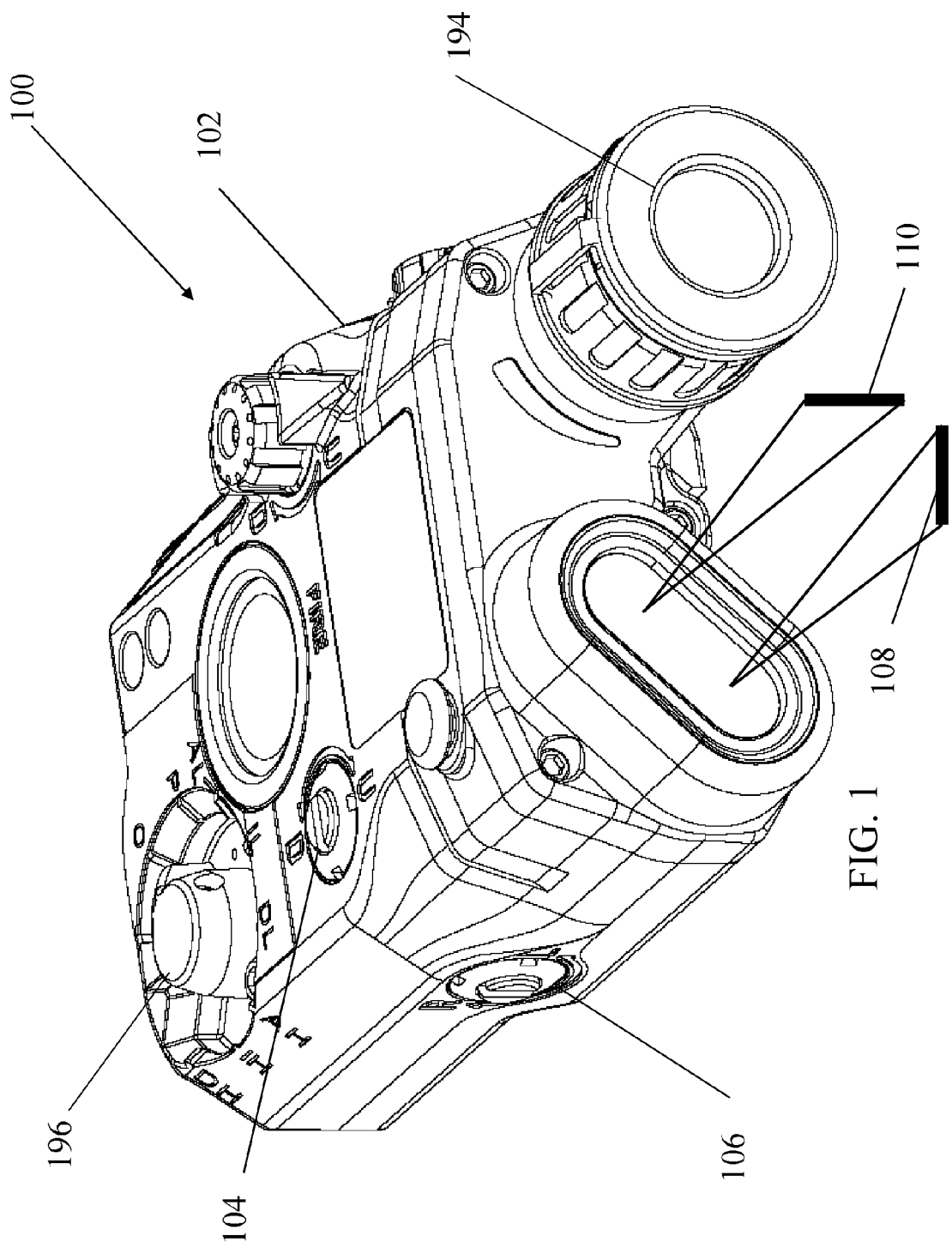
FIG. 1 is an isometric view of a weapon mountable sight consistent with an exemplary embodiment.
Figure 2:
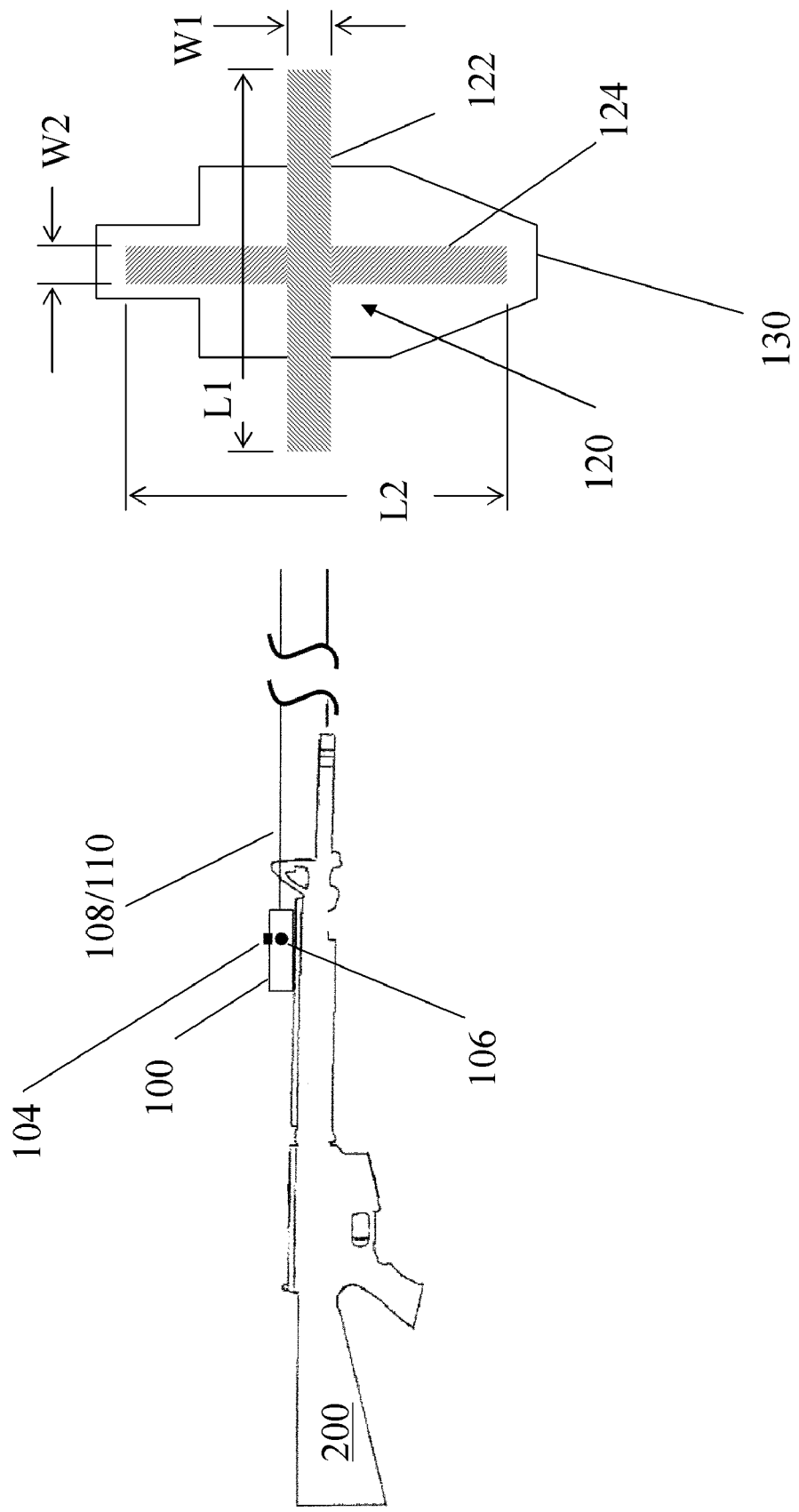
FIG. 2 is a side view of the weapon mountable sight of FIG. 1 attached to a weapon consistent an exemplary embodiment.

FIG. 1 is an isometric view of a weapon mountable sight 100 consistent an exemplary embodiment and FIG. 2 is a side view of the weapon mountable sight 100 attached to a weapon 200 consistent an exemplary embodiment. The sight 100 may generate a first generally rectangular light beam 108 and a second generally rectangular light beam 110 for projection of a cross 120 having a first bar 122 having a length L1 and a width W1, the length L1 being substantially greater (5× or more) than the width W1 and a second bar 124 having a length L2 and a width W2, the length L2 being substantially greater than the width W2 on a target 130. Some defocusing of the projected cross 120 may occur, but the resulting shape on a target generally conforms to a rectangle. The sight 100 may also have an infrared illuminator 194 that can be manipulated to go from a narrow beam of light to a wide, generally circular, beam of light.

The sight 100 may have a housing 102 for providing protection to internal components from unintended contact or debris. The sight 100 may be removably coupleable to the weapon 200 such as the M4A1 carbine or other weapon with a suitable attachment method, for example a rail grabber, slide-lock® mechanism, or other clamp. Alternatively, a sight may be incorporated in and/or formed as part of a weapon. For use after the sight 100 is coupled to a weapon, the housing 102 may have a first adjustor 104 and a second adjustor 106 to allow an operator to boresight the cross 120 with a projectile point of impact on a target 130 at a known distance or with a boresight alignment tool, for example a barrel mounted boresight laser.

Figure 3:
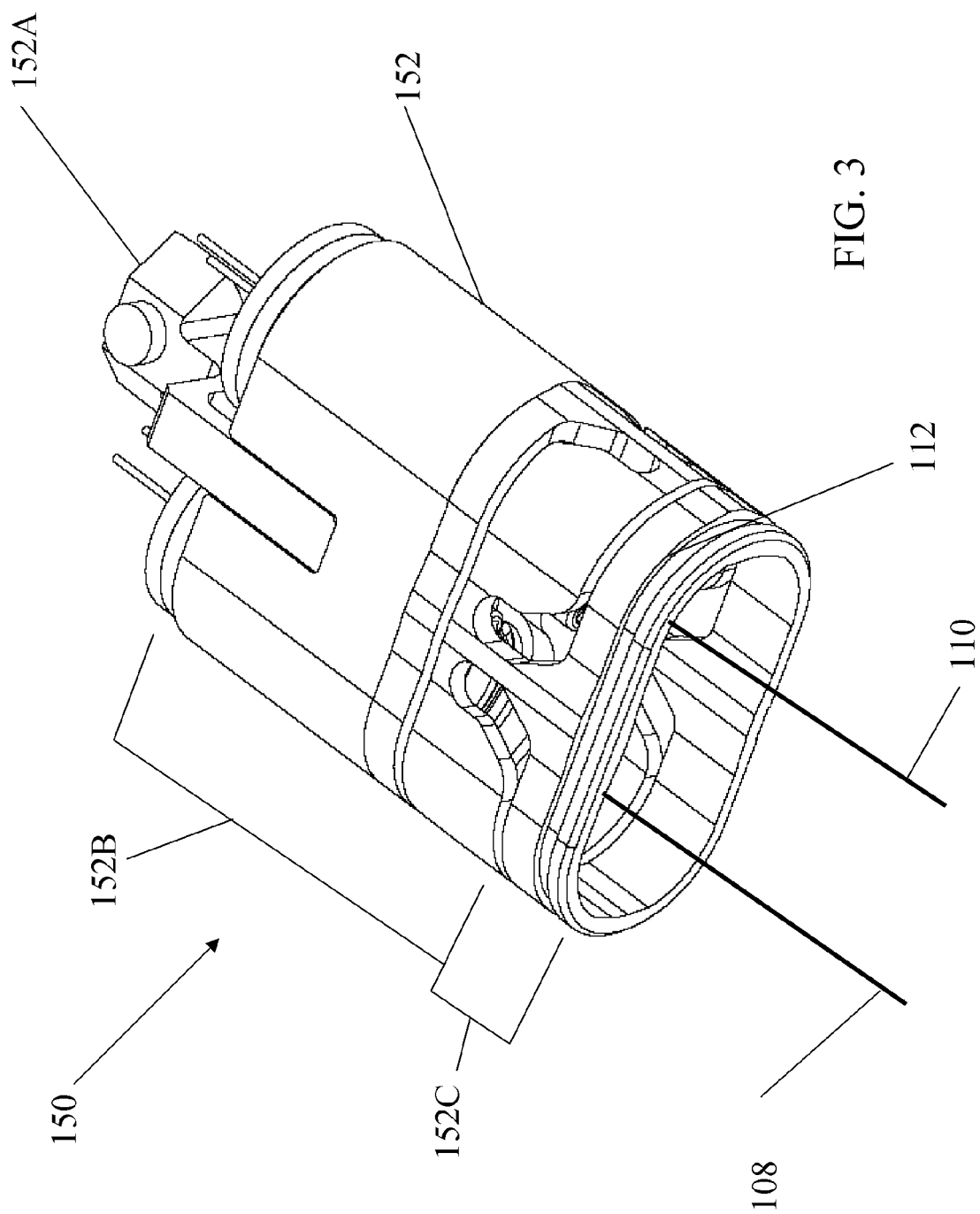
FIG. 3 is an isometric view of an optical bench assembly consistent with an exemplary embodiment.
Figure 4:
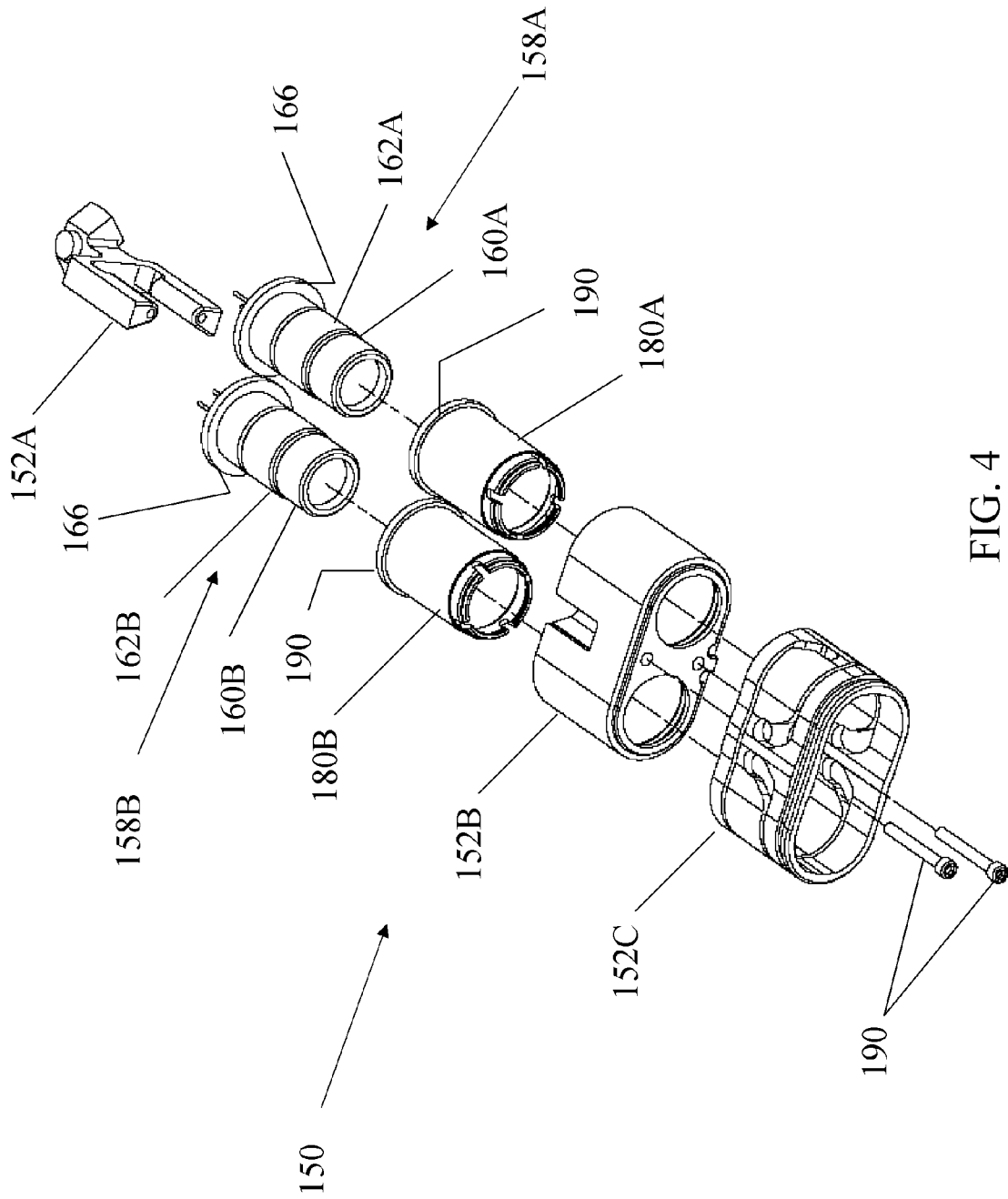
FIG. 4 is an exploded isometric view of the optical bench assembly of FIG. 3.
Figure 5:
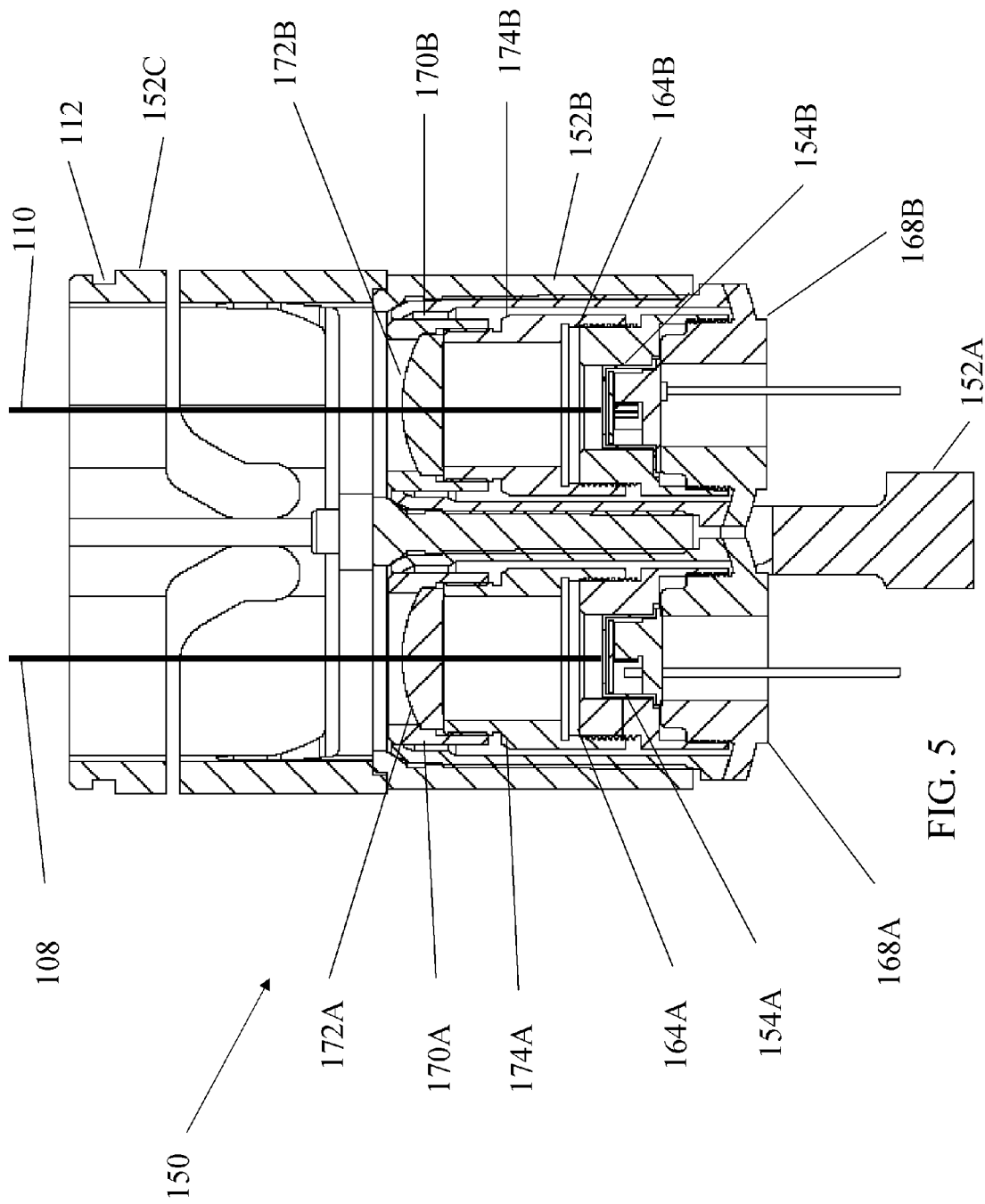
FIG. 5 is a cross-sectional view of the optical bench assembly of FIG. 3.
Figure 6:
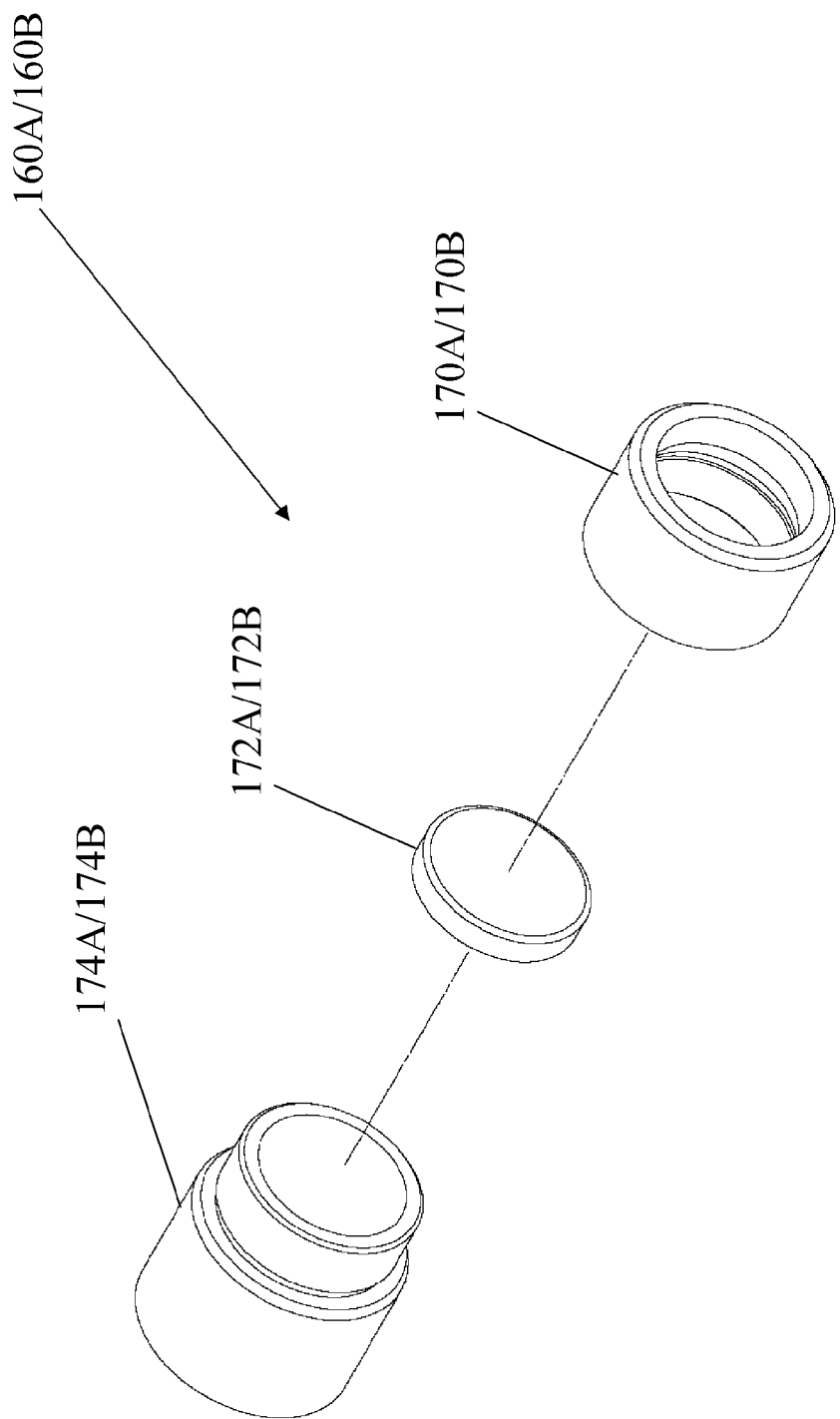
FIG. 6 is an exploded isometric view of a lens/housing assembly consistent with an exemplary embodiment.
Figure 7:
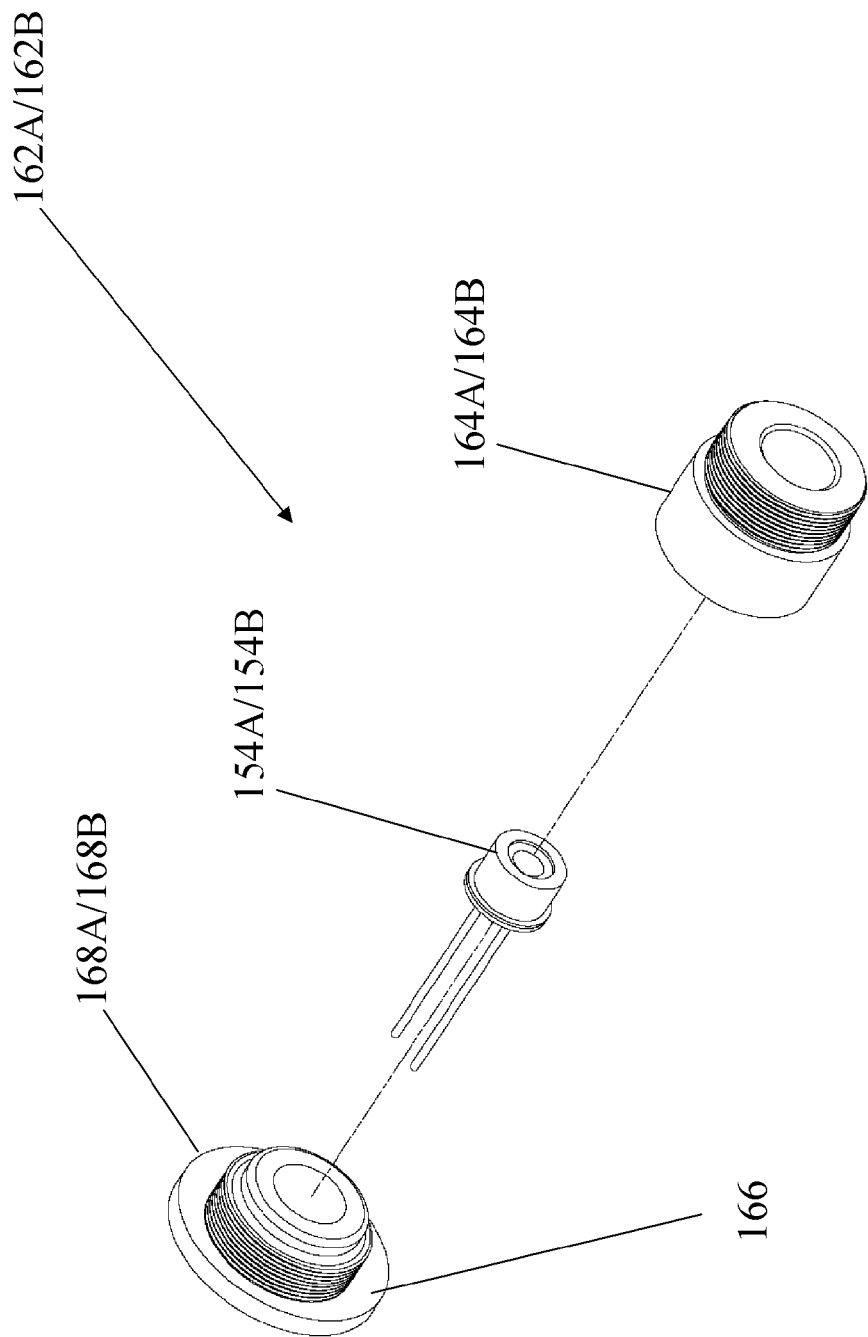
FIG. 7 is an exploded isometric view of a diode mounting assembly consistent with an exemplary embodiment.
Figure 8:
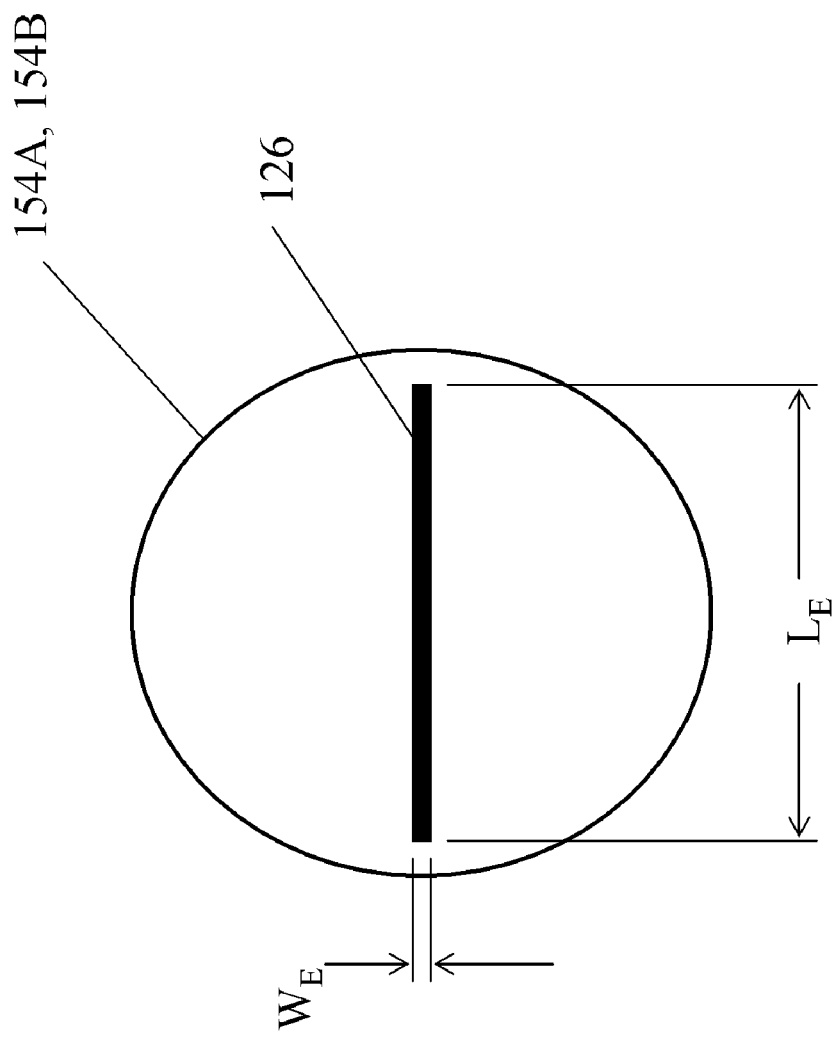
FIG. 8 is a front view of a laser diode consistent with an exemplary embodiment.

FIG. 3 is an isometric view of an optical bench assembly 150 consistent with an exemplary embodiment, FIG. 4 is an exploded isometric view of the optical bench assembly 150, FIG. 5 is a cross-sectional view of the optical bench assembly 150, FIG. 6 is an exploded isometric view of a lens/housing assembly consistent with an exemplary embodiment, FIG. 7 is an exploded isometric view of a diode mounting assembly consistent with an exemplary embodiment, and FIG. 8 is a front view of a laser diode consistent with an exemplary embodiment. An optical bench assembly 150 may have an optical bench 152 having a pivot adjuster section 152A, a dual barrel section 152B, and a flexure section 152C. The sections may be coupled together using one or more mechanical fasteners 190 or an epoxy. The optical bench sections 152A, 152B, and 152C may be a unitary piece or made of two or more pieces. An optical bench 152 may provide a structure to support electrical and optical components that may be secured to the optical bench 152 during the assembly process. The optical bench 152 can be made of metal, plastic, or other suitable material. The flexure section 152C may have a groove 112 or other feature that allows the optical bench 152 to be coupled to the housing 102. The adjustors 104, 106 may contact the pivot adjuster section 152A to steer the first light beam 108 and the second light beam 110 relative to the housing 102 to allow the first beam 108 and second beam 110 to be boresighted to a weapon. The adjustors 104, 106 may be orthogonally offset 90 degrees from each other to provide elevation and windage adjustment of the light beams 108, 110 relative to the housing 102. Springs or other biasing mechanisms may be used to provide a counter force to the adjustors 104, 106. Alternatively, electrically controllable actuators, for example MEMS or piezoelectric actuators, may be used to steer the light beams 108, 110.

The optical bench 152 may be configured to support a first pivot flange 180A, a second pivot flange 180B, a first laser aim assembly 158A, and a second laser aim assembly 158B. The optical bench assembly 150 can incorporate two or more laser diodes 154A, 154B. In an exemplary embodiment the laser diodes have a principal wavelength in the near infrared spectrum (between 750 nm and 3000 nm). In one embodiment, the laser diodes 154A, 154B operate around 1550 nm. Lasers operating around 1550 nm are considered "eye safe" and can be operated at significantly higher power levels than at shorter (<~1500 nm) or longer (>1700 nm) wavelength without causing damage to a user's eyes. The first light beam 108 may be generated by the first laser diode 154A having a first emitter 126 (see FIG. 8) having a length $L_E$ and a width $W_E$, the emitter length $L_E$ being substantially greater than (5× or more) the width $W_E$ and a second laser diode 154B having a second emitter having a length $L_E$ and a width $W_E$, the emitter length $L_E$ being substantially greater than the width $W_E$. The laser emitter 126 may have a width $W_E$ of 1-5 μm and a length of 50-300 μm. Other sized lasers may be used without departing from the invention. The laser diodes 154A, 154B may be powered by an internal battery or external power supply and operated at different user selectable power levels through an actuator 196.

The first laser aim assembly 158A may have a first diode mount assembly 162A secured to a first lens/housing assembly 160A. The first diode mount assembly 162A may have a first laser diode 154A secured by a first laser pivot mount 168A and a first laser mount 164A, with or without an epoxy. The epoxy may be time, wavelength, or thermally sensitive to allow proper positioning prior to forming a permanent bond. The first laser pivot mount 168A may have an arcuate surface 166. The first lens/housing assembly 160A may have a first collimating lens 172A secured between a first lens retainer 174A and a first lens mount 170A, with or with an epoxy. The first lens/housing assembly 160A may have a threaded portion that cooperates with a threaded portion on the first diode mount assembly 162A to allow an assembler to collimate the light beam from the emitter by increasing or decreasing the distance between the emitter 126 and the collimating lens 172A. When the output from the emitter is collimated the first lens/housing laser assembly 160A may then be secured to the first diode mount assembly 162A. Alternatively, the first lens/housing laser assembly 160A and the first diode mount assembly 162A may slide relative to each other to allow for precise positioning of the first collimating lens 172A relative to the emitter 126.

The pivot flange 180A may be coupled to the optical bench section 152B. The pivot flange 180A may have an arcuate rear surface 190 that cooperates with arcuate surface 166 of the first laser pivot mount 168A to allow an assembler to steer the first laser assembly 158A relative to the pivot flange 180A to allow the light beams 108, 110 to be steered.

A second laser aim assembly 158B may have a second diode mounting assembly 162B secured to a lens/housing assembly 160B. The second diode mount assembly 162B may have a second laser diode 154B secured by a second laser pivot mount 168B and a second laser mount 164B, with or without epoxy. The second lens/housing assembly 160B may have a second collimating lens 172B secured between a second lens retainer 174B and a second lens mount 170B, with or with an epoxy.

The first laser aim assembly 158A may be positioned in the optical bench 152 such that a longitudinal axis of the emitter 126 of the first laser diode 154A is generally perpendicular to a longitudinal axis of the emitter 126 of the second laser diode 154B. The generally rectangular first light beam 108 generated by the emitter 126 in the first laser diode 154A may be oriented generally perpendicular to the generally rectangular second light beam 110 generated by the emitter 126 in the second laser diode 154B. The first light beam 108 and the second light beam 110 may be aligned such that a midpoint of the first bar 122 of the cross 120 on the target 130 is aligned approximately with a midpoint of the second bar 124 on the target 130 when the target 130 is at a known distance from the aiming device 100.

Figure 9:
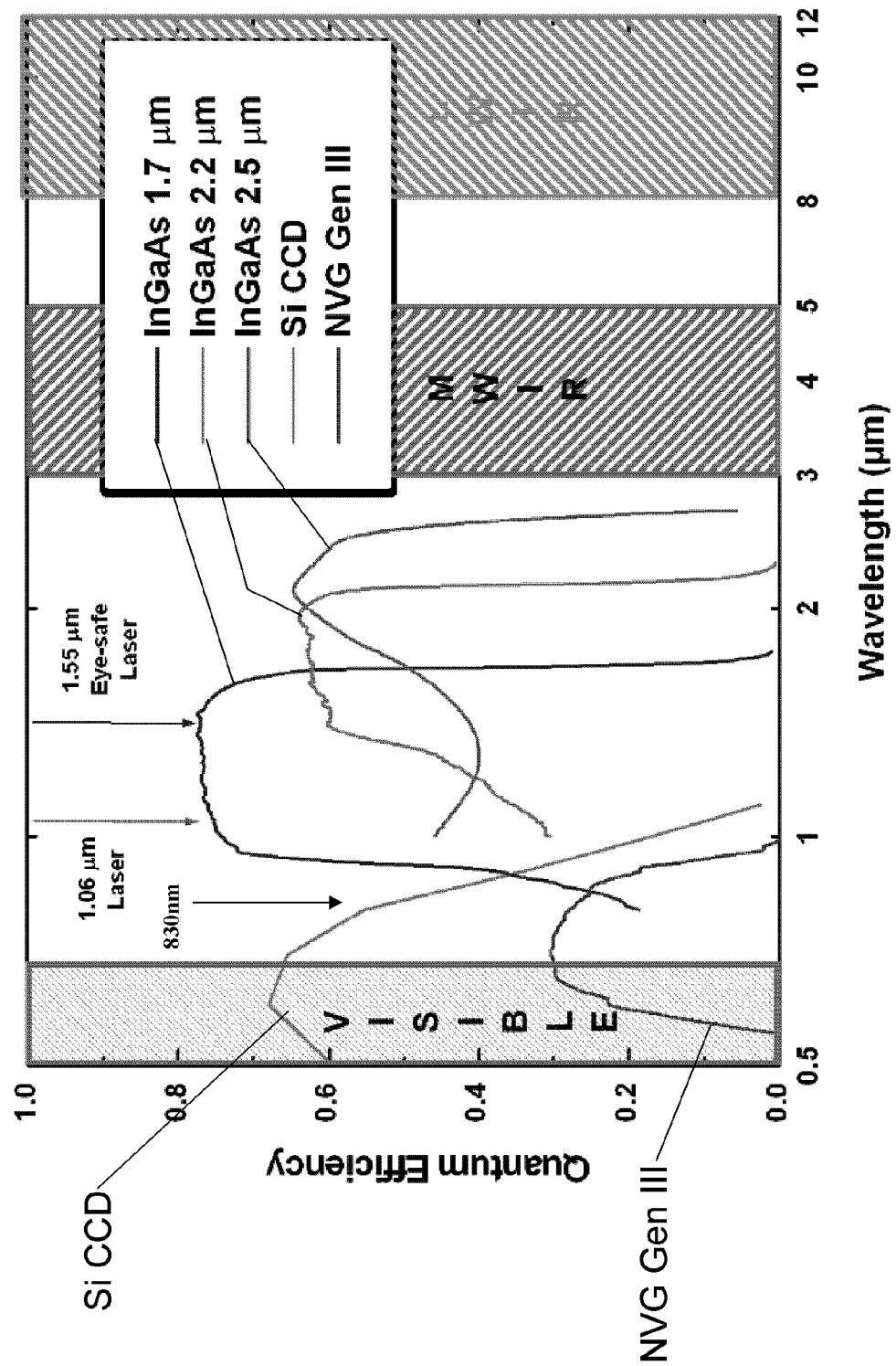
FIG. 9 is a graph of quantum efficiency vs. wavelength for a variety of imaging systems.

FIG. 9 is a graph of quantum efficiency vs. wavelength for a variety of imaging systems. The graph shows the visible spectrum extending from approximately 450 nm to approximately 750 nm and the short wave infrared spectrum extending from approximately 750 nm to approximately 3000 nm. The graph shows generation III image intensification night vision devices (NVG Gen III) operating from approximately 600 nm to just below 1 μm. Infrared laser illuminators and pointers operating around 830 nm can therefore be seen by these devices. As noted above, these illuminators and pointers can also be seen by the enemy. Si CCD sensors also work in these wavelengths and can be used by the enemy to detect near IR (NIR) pointers and illuminators.

FIG. 9 also shows several InGaAs sensors (1.7 μm, 2.2 μm, and 2.5 μm). The graph also shows that lasers operating at 1.06 μm and 1.55 μm are visible by these sensors, but not by the NVG or Si CCD sensors.

Figure 10:
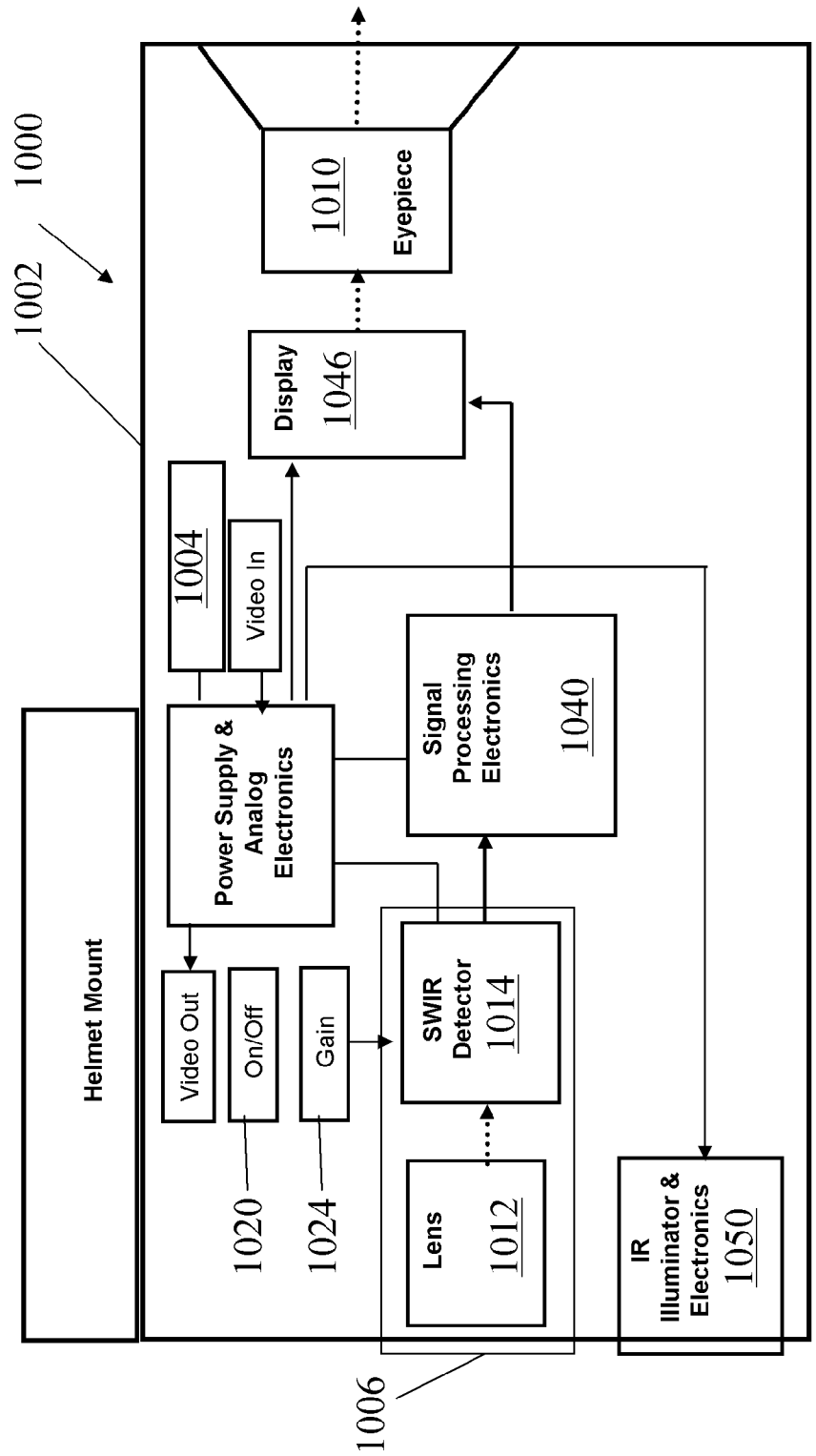
FIG. 10 is a block diagram of a SWIR vision system consistent with an embodiment of the invention.

FIG. 10 a block diagram of a SWIR vision system 100 consistent with an embodiment of the invention. The system electronics and optics are housed in a housing 1002, which can be mounted to a rifle or a military helmet and are powered by batteries 1004. Information from a short wave infrared (SWIR) detector channel 1006 is directed towards one or mores eyepieces 1010 for viewing by an operator. A channel may be an optical path through which scene information may travel and include a sensor.

The eyepieces 1010 may have one or more ocular lenses for magnifying and/or focusing the image. The SWIR channel 1006 may be configured to process information in a range of wavelengths from 750 nm to 3000 nm. The SWIR channel 106 may have an objective focus 112 and an SWIR detector 1014. The low end and the high end of the first range of wavelengths may vary without departing from the invention.

The housing 1002 may have actuators to control system on/off and display brightness and auto/manual gain of the SWIR channel. An on/off brightness potentiometer 1020 allows the operator to turn the system on and off and control the brightness of the image in the displays 1046 and the auto/manual gain potentiometer 1024 allows the operator to select between manual and automatic control of the gain of the SWIR channel 1006. In the SWIR vision system 1000, light entering the SWIR detector is sensed by a two-dimensional array of SWIR detector elements. The detector elements sense the reflected light and create a very detailed pattern, which is then translated into electric impulses that are communicated to the signal-processing electronics 1040. The signal-processing electronics then outputs the information to one or more displays 1046 for viewing by an operator. The display(s) 1046 may be a miniature flat panel display, for example a monochrome organic light emitting diode (OLED) microdisplay or a liquid crystal display (LCD).

The SWIR vision system 1000 may include infrared illuminator electronics 1050. The illuminator 1050 may be adjustable from a narrow pointer to a wide flood. Alternatively, the illuminator 1050 may have a fixed divergence. The illuminator 1050 may operate in the shortwave infrared spectrum, for example 1 µm to 3 µm, for example at 1060 nm or 1550 nm. A user of this system 1000 can view an area of interest or point at an area of interest without being detected by traditional image intensification night vision devices that operate at lower wavelengths.

FIG. 11A is a block diagram of a SWIR beacon 300 and FIG. 11B is a block diagram of a SWIR beacon 300'. The beacons may be covertly used to mark landing zones for helicopters, designate a friendly soldier, or to mark a target of interest. An operator using a night vision device with a SWIR detector would be able to see the beacon, but an operator using his naked eye or with an image intensification night vision device would not be able to see the beacon. The beacons 300, 300' may be coupled to a power supply 302, for example a conventional 9v battery having terminals 304 and 306. Other power sources may be used without departing from the invention. The beacons 300, 300' may be configured to output light in the SWIR range, for example at a wavelength above that which can be seen with image intensification night vision equipment, for example greater than 900 nm.

Beacon 300 may have a first housing 320 having terminals 322 and 324 that cooperate with battery terminals 304, 306 and an opening 328' through which a laser diode 328 extends. The laser diode 328 may be coupled to terminal 324 through a pulse generator. The laser diode 328 may operate at a frequency above that which can be seen with image intensification night vision equipment, for example greater than 900 nm, for example 1060 nm or 1150 nm. The frequency of the pulse generator may be adjustable. The operator placing the beacon may set the beacon to a particular frequency to distinguish one beacon from another. Additionally, the operator can set the beacon to a particular frequency so that if the operator sees a beacon at an improper frequency, for example a beacon found by the enemy, the operator can ignore that beacon. The frequency may be set using an encoder 340 extending from the housing 320. Alternatively, the frequency may be set through a process in which the operator connects the beacon 300 to the power supply 302 and then disconnects it. A processor 342 in the beacon could be used to set the frequency based on time between connects and disconnects, the number of disconnects in a preset amount of time, or the frequency of the disconnects. Alternatively, the beacon may have a port 344 through which the frequency is set. Alternatively, the beacon could receive a wireless signal to set the frequency.

Beacon 300' may have a first housing 330 having terminals 322 and 324 that cooperate with battery terminals 304, 306 and an opening 338' in which a long pass filter window or lens 350 is located. A light source 338, for example an incandescent bulb or LED, may be located in proximity to the window or lens 350 to allow light having a frequency above that which can be seen with image intensification night vision equipment, for example greater than 900 nm, to shine therethrough. The light source 338 may be coupled to terminal 324 through a pulse generator 360. The frequency of the pulse generator may be adjustable. The frequency of the pulses may be set as noted above with relation to beacon 300.

According to one aspect of the invention, there is provided a housing for at least partially enclosing a first laser diode and a second laser diode with each diode having an emitter having a length and a width with the length being substantially greater than the width and an optical bench configured to hold the first and the second laser diodes to project a cross on a target. The resulting cross made up of a first generally rectangular shape having a length and a width, the length being substantially greater than the width and a second generally rectangular shape having a length and a width, the length being substantially greater than the width.

According to one aspect of the invention, there is provided a night vision system including a housing, a first channel at least partially disposed within the housing for processing information in a first range of wavelengths and a laser having a principal wavelength that is above 900 nm and visible through the night vision system.

According to another aspect of the invention, there is provided a night vision system including a housing, a first channel for processing information in a first range of wavelengths, a display coupled to the first channel, and an infrared laser operating at a wavelength above 900 nm.

Although several embodiments of the invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

What is claimed is:

1. An aiming device, comprising:
a housing;
a first laser diode at least partially disposed in the housing, the first laser diode having a first emitter having a first length and a first width, the first length being substantially greater than the first width;
a second laser diode at least partially disposed in the housing, the second laser diode having a second emitter having a second length and a second width, the second length being substantially greater than the second width; and
an optical bench configured to hold the first and the second laser diodes to project a cross on a target.

2. The aiming device of claim 1, wherein the cross has a first generally rectangular shape having a first length and a first width, the first length being substantially greater than the first width and a second generally rectangular shape having a second length and a second width, the second length being substantially greater than the second width.

3. The aiming device of claim 2, wherein the first laser and the second laser are aligned in the optical bench such that a midpoint of the first generally rectangular shape is aligned approximately with a midpoint of the second generally rectangular shape on the target when the target is greater than 100 m from the aiming device.

4. The aiming device of claim 1, wherein the first laser diode and the second laser diode each have a principal wavelength between 900 nm and 3000 nm.

5. The aiming device of claim 4, wherein the first laser diode and the second laser diode each have a principal wavelength of between 1000 nm and 1600 nm.

6. The aiming device of claim 1, wherein the first emitter length is at least 10× the first emitter width and the second emitter length is at least 10× the second emitter width.

7. The aiming device of claim 1, wherein the first length of the first emitter is oriented generally orthogonal to the second length of the second emitter.

\* \* \* \* \*